US009045186B2

(12) United States Patent
Bailie et al.

(10) Patent No.: US 9,045,186 B2
(45) Date of Patent: Jun. 2, 2015

(54) ADJUSTABLE NOSE WIDTH BICYLE SEAT ASSEMBLY (71) Applicants: Jess Bailie, Lake Mills, WI (US); Po Liao, Taichung (TW)

(72) Inventors: Jess Bailie, Lake Mills, WI (US); Po Liao, Taichung (TW)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/938,044

(22) Filed: Jul. 9, 2013

(65) Prior Publication Data
US 2013/0292977 A1 Nov. 7, 2013

Related U.S. Application Data (63) Continuation of application No. 13/104,183, filed on May 10, 2011, now Pat. No. 8,480,169.

(51) Int. Cl.
*B62J 1/10* (2006.01)
*B62J 1/00* (2006.01)

(52) U.S. Cl.
CPC ... *B62J 1/10* (2013.01); *B62J 1/002* (2013.01)

(58) Field of Classification Search
USPC ................................. 297/201, 202
See application file for complete search history.

(56) References Cited

U.S. PATENT DOCUMENTS

| 622,357 | A | * | 4/1899 | Hitchcock et al. | 297/201 |
|---|---|---|---|---|---|
| 633,487 | A | * | 9/1899 | Radermacher et al. | 297/201 |
| 749,865 | A | * | 1/1904 | Jarvis | 297/188.09 |
| 5,823,618 | A | * | 10/1998 | Fox et al. | 297/201 |
| 6,290,291 | B1 | * | 9/2001 | Kojima | 297/201 |
| 6,422,647 | B1 | * | 7/2002 | Turudich | 297/201 |
| 6,761,400 | B2 | * | 7/2004 | Hobson | 297/201 |
| 6,786,542 | B1 | * | 9/2004 | Nuzzarello | 297/201 |
| 7,581,787 | B2 | * | 9/2009 | Livne | 297/215.13 |
| 8,480,169 | B2 | * | 7/2013 | Bailie et al. | 297/201 |
| 2003/0038515 | A1 | * | 2/2003 | Martin et al. | 297/195.1 |

* cited by examiner

Primary Examiner — David R Dunn
Assistant Examiner — Timothy J Brindley (57) ABSTRACT A bicycle seat assembly having an adjustable width nose portion includes an H-shaped base that supports a lateral left side pad and a lateral right side pad. A rail extends under the base and between the left and right side nose portions of the seat assembly. A front rail mount includes a housing, a shuttle, an actuator, and left and right mount supports. Operation of the actuator alters the position of the left and right mount supports relative to the housing and thereby alters a distance between the respective left and right side nose portions of the seat base.

10 Claims, 6 Drawing Sheets

ADJUSTABLE NOSE WIDTH BICYCLE SEAT ASSEMBLY

CROSS-REFERENCE TO RELATED PATENT APPLICATIONS

This application is a Continuation of U.S. application Ser. No. 13/104,183, filed May 10, 2011, now U.S. Pat. No. 8,480, 169, which is incorporated herein by reference in its entirety.

BACKGROUND

The present invention relates generally to bicycles and, more particularly, to an adjustable bicycle seat or saddle assembly that includes a bifurcated nose portion. Alternate respective halves of the nose portion can be moved in an inward or outward lateral direction with respect to a longitudinal axis of the seat assembly to attain a desired interaction with the adjacent anatomy of an individual rider.

Many bicycle riders experience discomfort attributable to even moderate durations spent seated upon a bicycle seat. The multitude of bicycle seats on the market attests to the wide range of rider preferences and suggests that the final solution has yet to be found. Seat comfort depends on many factors, among them, the compliance or firmness of the padding, the appropriate seating surface shape, rider anatomy, compliance and/or responsiveness to rider motion associated with pedal operation, and even individual rider preference.

The thickness of padding along with the density or firmness of the padding also has an effect on comfort. Generally, increased pressure between the rider's body and the seat results in increased discomfort for the rider. The opposite is also true: decreasing pressure generally results in decreased discomfort. In an effort to reduce pressure, some seat designs have targeted specific areas of the rider's body that are less able to withstand pressures by completely removing material from the seating surface (cutout seats), thus eliminating pressure at that spot. However, such seats invariably must increase the pressure elsewhere on the body because the same portion of the rider's body weight is now supported over a decreased surface area, thus increasing the pressure on the parts of the body that remain in contact with the remaining surface of the seat and are more able to tolerate such increased loading.

Yet another source of seat discomfort that is unaccounted for in many seat designs is the natural movement of the rider. All riders' pelvises move during pedaling, and seats need to be designed to accommodate, not oppose, such natural pelvis movement. For example, during the study of the three dimensional movements of over two dozen men and women, it was found that during each pedal stroke, the pelvis moves so that the hip joint translates (on average) roughly 10 millimeters forward and roughly 10 millimeters downward with each downstroke of the pedal. This movement was generally unaffected by changing the rider's power output or the seat's rear view curvature or compliance and is therefore considered to be a natural movement. This movement can also be described as a twisting (about a vertical axis) and rolling (about a longitudinal axis) of the riders' pelvis. This natural movement of the pelvis may contribute to discomfort through a shearing or scrubbing stress between the rider and the seat surface, and through a cyclic increase and decrease of the pressure between the rider's leg and the top surface and outer edges of the seat.

Another source of discomfort on some bicycle seats is that skeletal dimensions differ from one individual to the next. A rider whose pelvic dimensions are mis-matched to the seat's dimensions can experience discomfort as a result. For example, it can be uncomfortable for a rider with narrow pelvic dimensions to sit on a wider seat, since the extra width of the seat may interfere with the rider's natural pedaling motion by, for example, the rider's legs pushing on the sides of the seat. This pushing can cause intermittent pressure with each pedal stroke as well as chafing of the skin as the leg rubs across such an unyielding seat surface.

Likewise, it may be uncomfortable for a rider with wider pelvic dimensions to sit on a narrow seat, since the sit bones are then supported more medially on the ischiopubic rami, at a sloped angle that increases the lateral force component of the rider's body weight on the seat. This lateral force component, though helpful in controlling lateral movement and stability of the bicycle, can, if it grows too large, lead to excessive pressure on the rider's body at these contact points resulting in rider discomfort.

In some cases, when the rider's pelvic width is much larger than the seat's width, the sit bones may be completely off the edges of the seat. Such an association can cause an even greater increase in pressure and discomfort on the inner edges of the ischiopubic rami, can greatly increase the pressure along the center of the seat's length and therefore on the rider's corresponding perineum or perineal region, and therefore lead to even greater rider discomfort.

Yet another influence on seat discomfort is the ability of the seat to comfortably accommodate the genital area of the rider. Pressure on the genitals or perineum of the rider can be uncomfortable due to the nerves in this area and/or because the flesh there is seldom sat upon, is generally highly sensitive, has limited musculature, and is frequently less toughened than adjacent areas of the anatomy. Discomfort associated with pressure in this area is especially evident in individuals who are not accustomed to sitting on a bicycle seat. The increased pressure on the left and right side contact points of the ischiopubic rami can also lead to increased rider discomfort. This discomfort is sometimes described as a "splitting effect." Others have attempted to provide a more comfortable saddle but such seats are commonly provided as a fixed shape saddle. Many such seats include a generally elongated longitudinal recess, groove, or channel that is shaped to accommodate the genital area and/or limit contact with the rider genitals and/or perineum. Unfortunately, each fixed shape seat assembly has a very limited field of consumers or users such that large scale manufacturing of such seat assemblies is generally unfeasible.

Therefore, there is a need for a bicycle seat system that accommodates the genitals or perineum of the rider, provides a desired lateral stiffness to allow desired lateral interaction with the seat, and can satisfy the individual preferences of more than one class, gender, or physical shape of a user. The present invention discloses such a bicycle seat system.

SUMMARY

The present invention provides an adjustable bicycle seat assembly that can quickly and conveniently be adjusted to satisfy the preference of a given user from a large group of riders. One aspect of the invention is directed to a bicycle seat assembly having an adjustable width nose portion. The seat assembly includes an H-shaped base that supports a lateral left side pad and a lateral right side pad. A rail extends under the base and between the left and right side nose portions of the seat assembly. A front rail mount assembly includes a housing or rail garage, a shuttle, an actuator, and left and right movable supports. Operation of the actuator alters the position of the left and right movable supports relative to the rail garage and thereby alters a distance between the respective left and right side nose portions of the seat base. Such a construction allows a user to uniquely configure the shape of the seat assembly to achieve a more preferential seat shape.

Another aspect of the invention that is usable with one or more of the aspects discussed above discloses an adjustable width bicycle seat assembly having a housing that is secured to a seat rail. The assembly includes a shuttle body that is slidably positioned with respect to the housing and the seat rail. An adjuster is engaged between the housing and the shuttle body such that rotation of the adjuster translates the shuttle body relative to the housing along an axis of rotation of the adjuster. A mount body that is constructed to be secured to a portion of a saddle shell is engaged with the adjuster such that rotation of the adjuster translates the mount body and the portion of the saddle shell in a direction that crosses the axis of rotation of the adjuster.

Another aspect of the invention that is usable with one or more of the aspects discussed above discloses a bicycle seat assembly having a shell that includes a right side portion and a left side portion that are connected by a web wall that extends across a longitudinal centerline of the bicycle seat assembly. A first pad overlies the right side portion of the shell and a second pad overlies the left side portion of the shell. The first pad and the second pad are shaped to define a channel that extends along the longitudinal center line of the assembly. The assembly includes a shuttle that is slidably associated with a rail garage, a pair of mount bodies, and an adjuster that is engaged with the shuttle and the rail garage. The adjuster is rotatable about an axis that is aligned with the longitudinal centerline of the assembly such that operation of the adjuster manipulates a position of the shuttle relative to the rail garage. The first mount body is secured to the right side portion of the shell and the second mount body is secured to the left side portion of the shell. The first and the second mount bodies are engaged with the shuttle such that fore and aft translation of the shuttle yields lateral translation of the first and second mount bodies.

Another aspect of the invention that is usable with one or more of the aspects discussed above discloses a bicycle seat assembly that includes a base having a right nose portion and a left nose portion. The nose portions are separated by a gap that extends along a longitudinal axis of the bicycle seat assembly between the right nose portion and the left nose portion. A first mount body is secured to the left nose portion and a second mount body is secured to the right nose portion. The assembly includes an actuator that is engaged with a rail support and rotatable about an axis that is aligned with the longitudinal axis of the bicycle seat assembly. A guide is operatively connecting the actuator, the first mount body, and the second mount body so that rotation of the actuator 1) translates the actuator in a direction aligned with the axis of the actuator, 2) translates the first mount body in a first lateral direction, and 3) translates the second mount body in a second lateral direction opposite the first lateral direction.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF THE ILLUSTRATIVE EMBODIMENTS

Figure 1:
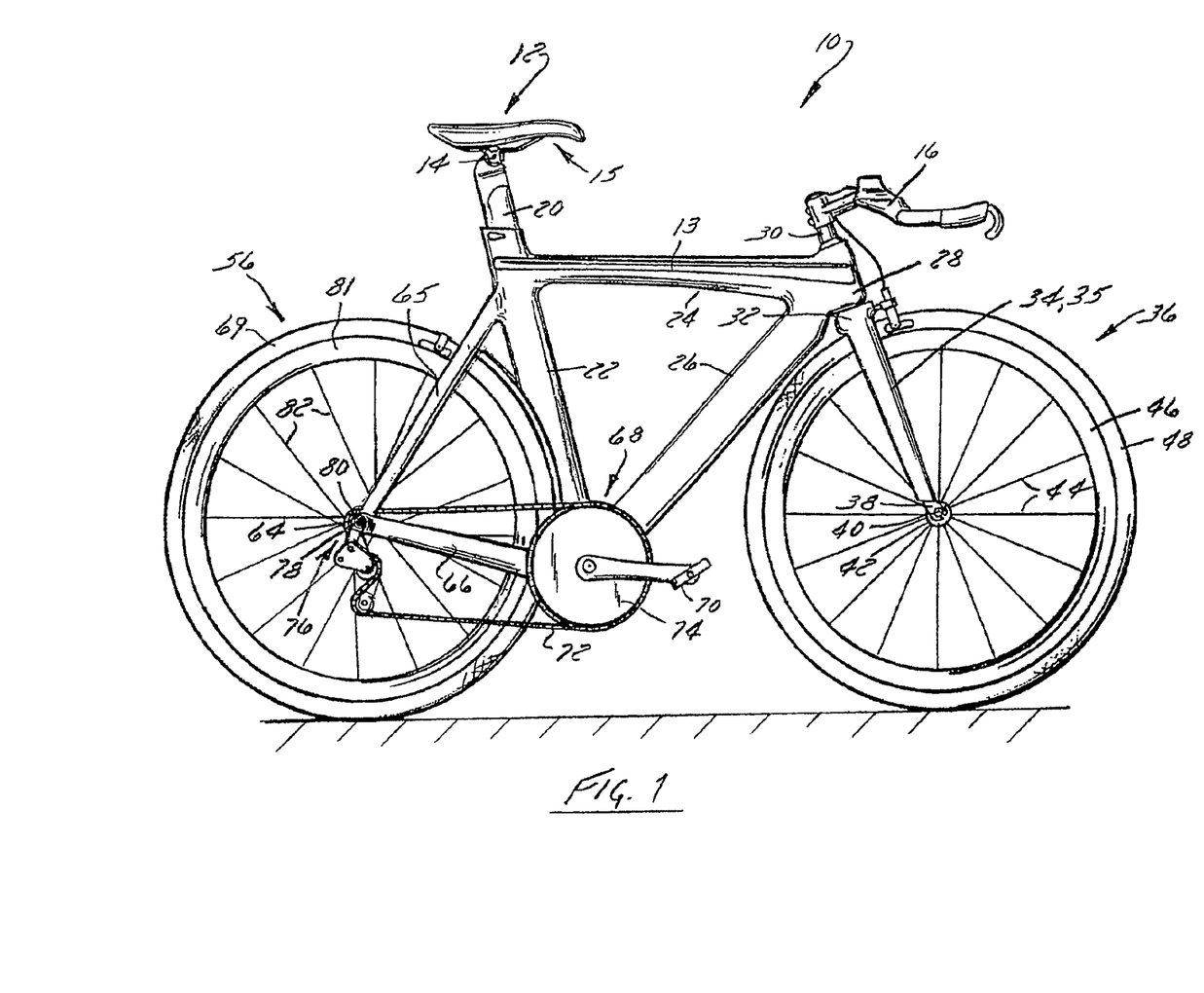
FIG. 1 is an elevational view of a bicycle equipped with an adjustable bicycle seat assembly according to the present invention.

FIG. 1 shows a bicycle 10 equipped with a bicycle seat or bicycle saddle assembly or simply seat assembly 12 that is constructed in accordance with the present invention. Bicycle 10 includes a frame 13 to which seat assembly 12 and handlebars 16 are attached. A seat clamp 14 is engaged with an underside 15 of seat assembly 12 and cooperates with a seat post 20 that slidably engages a seat tube 22 of frame 13. A top tube 24 and a down tube 26 extend forwardly from seat tube 22 to a head tube 28 of frame 13. Handlebars 16 are connected to a steerer tube 30 that passes through head tube 28 and engages a fork crown 32. A pair of forks 34, 35 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. Crankset 68 includes pedals 70 that are operationally connected to a flexible drive such as a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 associated with a rear tire 69 of rear wheel assembly 56. A number of spokes 82 extend radially between hub 80 and a rim 81 that supports tire 69 of rear wheel assembly 56. As is commonly understood, rider operation of pedals 70 drives chain 72 thereby driving rear tire 69 which in turn propels bicycle 10. It is appreciated that bicycle 10 could be provided in either of a road bicycle of mountain or off-road or trail bicycle configuration. It is appreciated that each configuration includes features generally directed to the intended operating environment of the bicycle. For example, trail bicycles generally include more robust suspension and tire systems than road bicycles. It is further appreciated that the seat system of the present invention is equally applicable to stationary bicycles and/or other vehicles or devices configured to support a seated rider and constructed for generally cyclic and/or repeatable movement of a user's legs.

FIGS. 2-5 show seat assembly 12 removed from bicycle 10 and seat clamp 14 removed therefrom. Referring to FIGS. 2-5, seat assembly 12 includes an upper side or topside 84 that faces a rider when the rider is seated thereupon on bicycle 10. Seat assembly 12 includes a base 86 and a rail 87 that includes a first rail portion 88 and a second rail portion 90 that extend along opposite lateral sides of underside 15 of seat assembly 12. As explained further below, rail 87 is preferably constructed as a one-piece or unitary body that is contoured to both the left and right hand longitudinal portions of the rail. Rail 87 preferably extends a substantial portion of the longitudinal length of seat assembly 12. Regardless of the specific construction of rail 87, first and second rail portions 88, 90 cooperate with seat clamp 14 to secure seat assembly 12 to seat tube 20.

Seat assembly 12 includes a forward or nose portion 96, a rear portion 98, and opposite lateral side portions 100, 102. As used herein, the longitudinal direction or axis of assembly 12 is the longest axis of the respective structure or assembly whereas the lateral directions are those directions that are oriented in a crossing, and preferably perpendicular direction within a horizontal plane associated with the longitudinal axis. It is further understood that the longitudinal axis of seat assembly 12 is aligned with a longitudinal axis or axis aligned with the direction of operation of bicycle 10 when the seat assembly is attached thereto and the lateral directions of seat assembly 12, as determined from the longitudinal axis, are oriented toward the opposite left and right hand sides of the bicycle as determined by a rider positioned for operation of bicycle 10.

Figure 2:
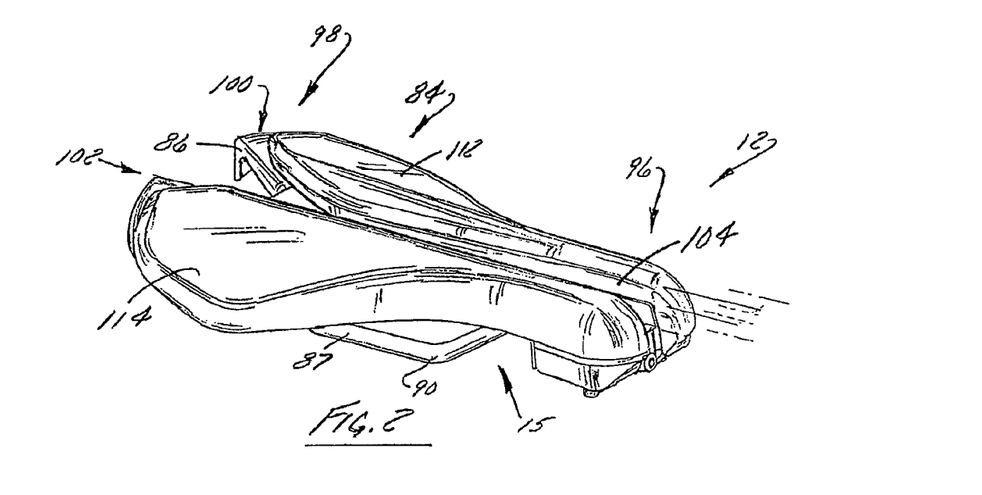
FIG. 2 is a top side perspective view of the bicycle seat assembly shown in FIG. 1 with the seat assembly removed from the bicycle.
Figure 4:
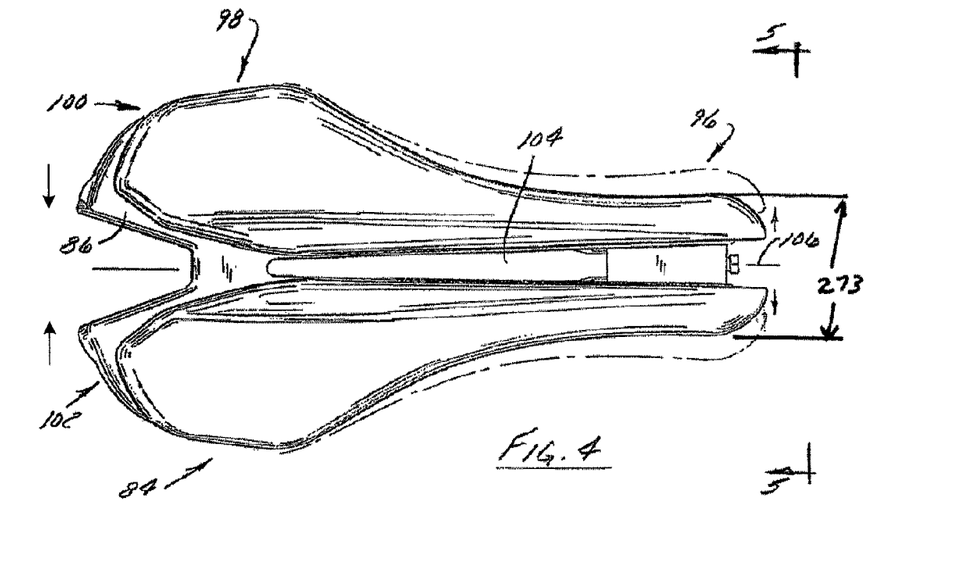
FIG. 4 is a top plan view of the bicycle seat assembly shown in FIG. 2.
Figure 5:
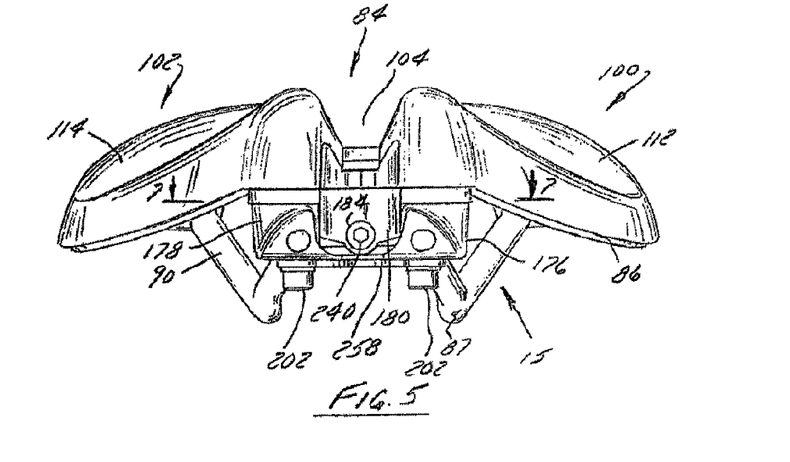
FIG. 5 is a front elevation view of the seat assembly shown in FIG. 2 taken along line 5-5 shown in FIG. 4.

As shown in FIGS. 2, 4, and 5 side portions or left hand side portion 100 and right hand side portion 102 of seat assembly 12 extend along a longitudinal length, indicated by axis 106, of seat assembly 12. Left and right hand side portions 102 are spaced apart and shaped to define a groove 104 that extends along a longitudinal length 106 of seat assembly 12. Preferably, groove 104 extends the entire length of seat assembly 12. Left side portion 100 and right side portion 102 each include a pad 112, 114 that extends along base 86 in a generally upward direction to more completely define or increase the vertical depth associated with groove 104. Pads 112, 114 are preferably constructed of a softer and/or more pliable material than base 86 to provide a more comfortable rider interaction with seat assembly 12. It is appreciated that pads 112, 114 can be constructed to include a cover layer and one or more overlapping or discrete padding layers.

Figure 3:
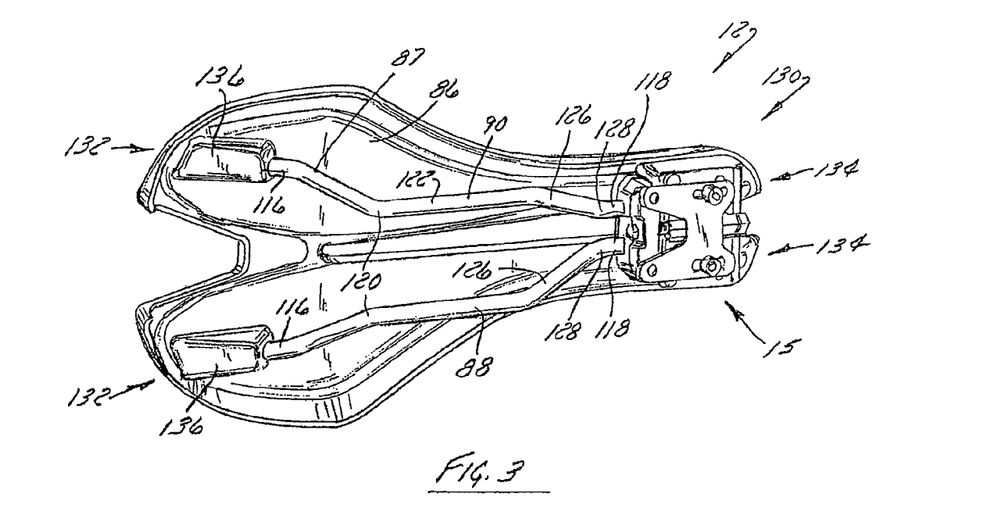
FIG. 3 is a bottom side perspective view of the seat assembly shown in FIG. 2.

Referring to FIG. 3, the alternate lateral portions 88, 90 of rail 87 each include a rearward directed end portion 116 and a forward directed end portion 118. A first section 120 of each rail portion 88, 90 tapers forward and slightly inward of rearward end portion 116. A second section 122 extends forward from each first section 116 and is generally in parallel alignment with longitudinal axis 106 (FIG. 4) of seat assembly 12. The second section 122 of each rail portion 88, 90 extends along a portion of underside 15 of seat assembly 12 and is offset outward from base 86 and is offset to generally opposite lateral sides of longitudinal axis 106 of seat assembly 12. The second section 122 of each rail portion 88, 90 is positioned to generally cooperate with seat clamp 14, shown in FIG. 1, for securing seat assembly 12 to seat post 20.

The alternate lateral portions 88, 90 of rail 87 each include a third section 126 that is positioned forward of each second section 122. Each third section 126 is inclined toward base 86 and toward the longitudinal axis 106 with respect to a forward direction of seat assembly 12. Each rail portion 88, 90 includes a fourth section 128 that extends forward of the third section 126. Each fourth section 128 is secured to base 86 of seat assembly 12 by a forward rail mount assembly 130. Preferably, fourth sections 128 are interconnected so as to form a unitary continuous rail between alternate end portions 116.

As explained further below, forward rail mount assembly 130 is constructed to securely engage rail 87 and base 86 of seat assembly 12 but is also constructed to allow the lateral displacement of the nose portion of the alternate left and right hand side portions 100, 102 of seat assembly 12 relative to one another. As shown in FIG. 3, first, second, third, and fourth sections 120, 122, 126, 128 of each rail portion 88, 90 of rail 87 transitions from an outboard location 132 at the rear of seat assembly 12 to a more inboard location 134 toward the front of seat assembly 12 and nearer interaction with rail mount assembly 130. Such a construction provides for the gradual tapering of the shape of seat 12 in the fore and aft directions thereby defining the broader rear portion and the narrower nose portion of seat assembly 12 and facilitates a controlled pitching of seat assembly 12 during rider operation of pedals 70 of bicycle 10.

Still referring to FIG. 3, base 86 of seat assembly 12 includes aft cavities 136 that engage the alternate rear ends 116 of rail 87 associated with each rail portion 88, 90 thereby securing the rear end of each rail portion 88, 90 to base 86 at a desired position. It is appreciated that rear ends 116 could be captured during an integral formation of base 86 thereabout or simply connected to base 86. It is further appreciated that base 86 and rail 87 may be constructed of the same or different materials. That is, base 86 and rail 87 may be constructed of various metal, composite, or plastic materials. As mentioned above, base 86 is constructed such that rail 87 is attached or constructed to cooperate with base 86 so as to encourage base 86 to "roll" during a pedaling operation. That is, base 86 and rail portions 88, 90 are constructed such that the rails deflect in response to shifting rider weight associated with pedaling. Accordingly, seat assembly 12 is constructed to be responsive to rider loading so as to maintain a generally normal orientation of the respective lateral sides of seat 12 to the rider's anatomy. Such deflection, in cooperation with groove 104, ensures reduced compression of the riders deformable areas commonly attributed to interaction with a non-pliable seat during pedaling operations.

Figure 6:
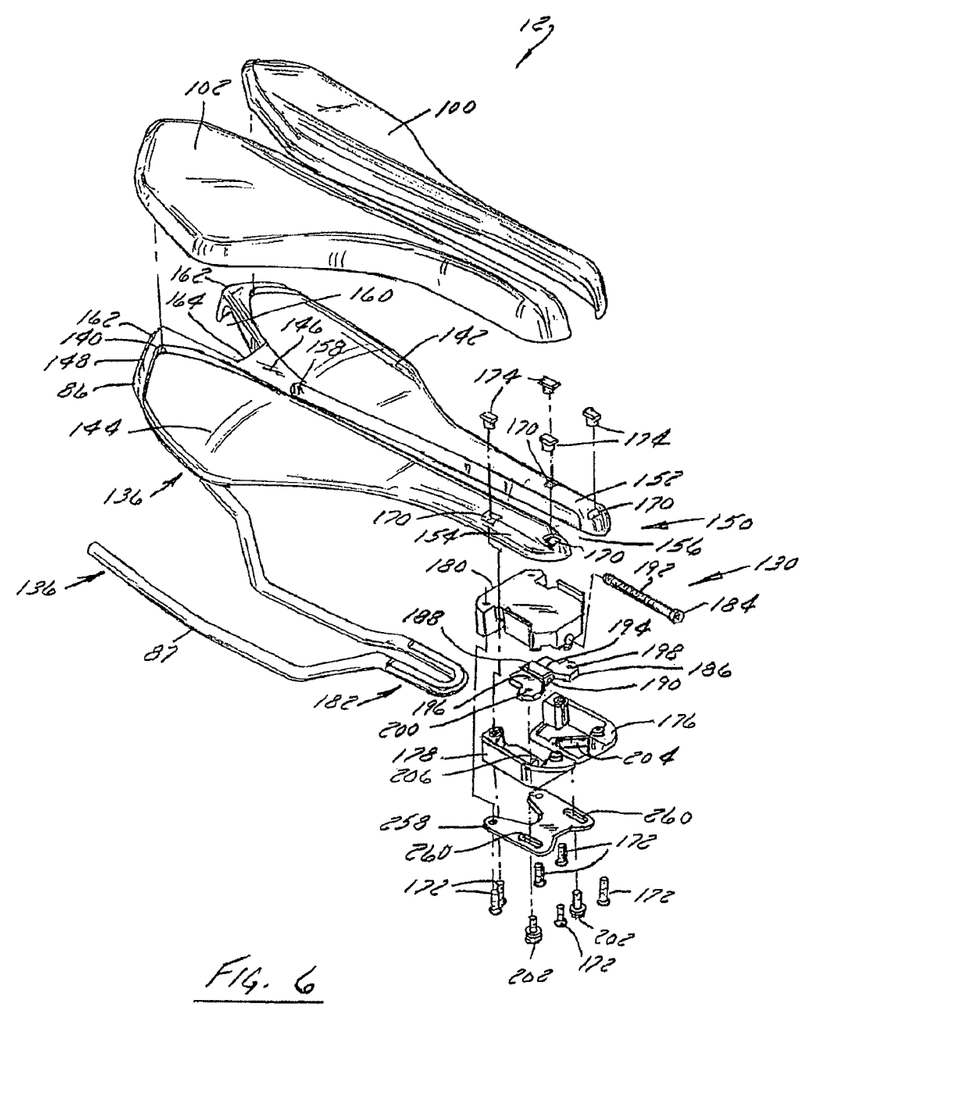
FIG. 6 is an exploded view of the bicycle seat assembly shown in FIG. 2.

FIG. 6 shows an exploded view of seat assembly 12. Respective seat pads 100, 102 are exploded from seat base 86. Seat base 86 is formed as a one-piece body 140 having alternate left 142 and right 144 side portions. Side portions 142, 144 of base 86 extend in the longitudinal direction generally aligned and offset in the opposite lateral directions from longitudinal axis 106 of seat assembly 12. A web wall 146 extends in a lateral direction between the alternate side portions 142, 144 of base 86. Preferably, web wall 146 is located nearer a rearward end 148 of base 86 than a forward end 150 thereof. Web wall 146 is constructed to accommodate lateral movement of a left-hand nose portion 152 relative to a right-hand nose portion 154 of base 86 in response to adjustment of forward rail mount assembly 139.

An elongated groove or channel 156 is formed between side portions 142, 144 of base 86. Channel 156 extends from a forward tip of nose portion 152 of base 86 to a forward facing edge 158 of web wall 146. A recess 160 is formed between rearward portions of alternate side portions 142, 144 of base 86 and extends between a rearward edge 162 of alternate side portions 142, 144 of base 86 and a rear facing wall 164 of web wall 146 of base 86. Recess 160 accommodates the scissors-like motion of side portions 142, 144 of base 86 about web wall 146 associated with manipulation of forward rail mount assembly 130 as explained further below. When the left nose portion 152 and the right nose portion 154 move toward one another, the rearward edges 162 of alternate side portions 142, 144 of base 86 move away from each other.

Each of left and right-hand nose portions 152, 154 of base 86 include a number of passages 170 that are shaped to receive one or more fasteners 172 and corresponding nuts 174. Fasteners 172 and nuts 174 cooperate with one another and a respective mount body to secure left and right hand mount bodies 176, 178 to a respective alternate lateral nose portion 152, 154 of base 86. Forward rail mount assembly 130 includes a housing or a forward rail garage 180 that is fixedly secured to a forward portion 182 of rail 87. An adjuster or actuator 184 is rotationally supported by rail garage 180 and operatively engaged with a shuttle body or simply a shuttle 186 that is slidably positioned with respect to garage 180.

Referring to FIGS. 6-9, shuttle 186 includes a center portion 188 having a threaded bore 190 that is configured to rotationally cooperate with a threaded portion 192 of actuator 184. Shuttle 186 includes a first arm 194 and the second arm 196 that extend an opposite lateral directions relative to center bore 190. Each arm includes a passage 198, 200 that is constructed to receive a pin or a post 202 that slidably cooperates with a channel 204, 206 formed in each of the respective mount bodies 176, 178. As explained further below with respect to FIGS. 7-12, rotation of actuator 184 relative to rail garage 180 translates shuttle 186 in a longitudinal direction along the axis of actuator 184 and along the longitudinal axis 106 of seat assembly 12 such that the interaction between posts 202 and grooves 204, 206 translates each of mount bodies 176, 178 of forward rail mount assembly 130 relative to rail garage 180 and seat rail 87 in opposite laterally inward and outward directions. Said another way, operation of actuator 184 manipulates the position of nose portion 152 of seat assembly 12 relative to the position of nose portion 154 of seat assembly 12 in a lateral direction and thereby manipulates the width associated with channel 156 and groove 104. It is further appreciated that each of the left side nose portion and the right side nose portion of saddle assembly 12 are concurrently moveable, and experience the same relative degree of translation during manipulation of actuator 184, relative to longitudinal axis 106 of seat assembly 12.

Figure 7:
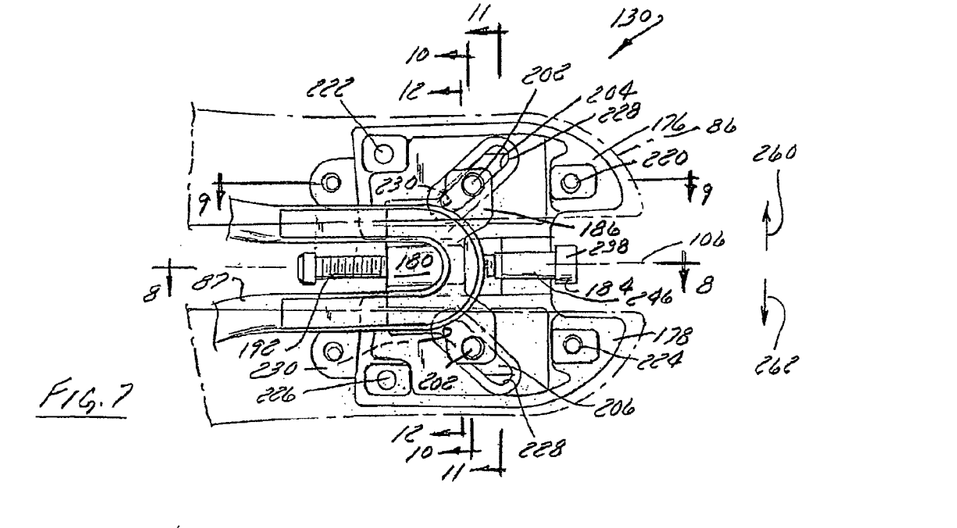
FIG. 7 is bottom plan view of a front rail mount portion of the seat assembly shown in FIG. 2 with a lower plate shown in FIG. 3 removed therefrom.
Figure 8:
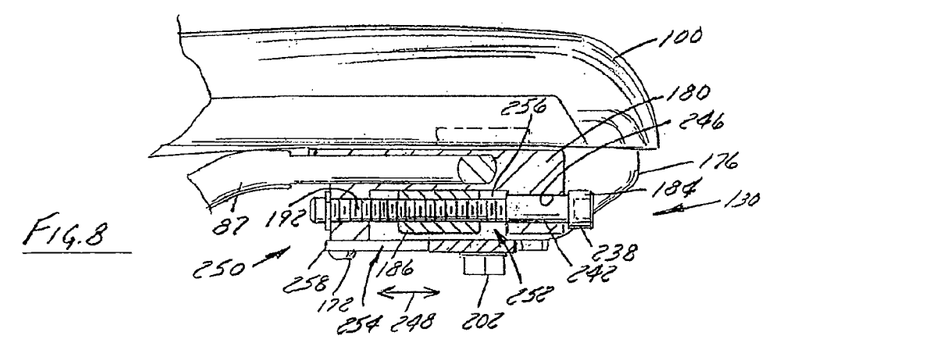
FIG. 8 is a longitudinal cross section view of the front rail mount assembly taken along line 8-8 shown in FIG. 7.
Figure 9:
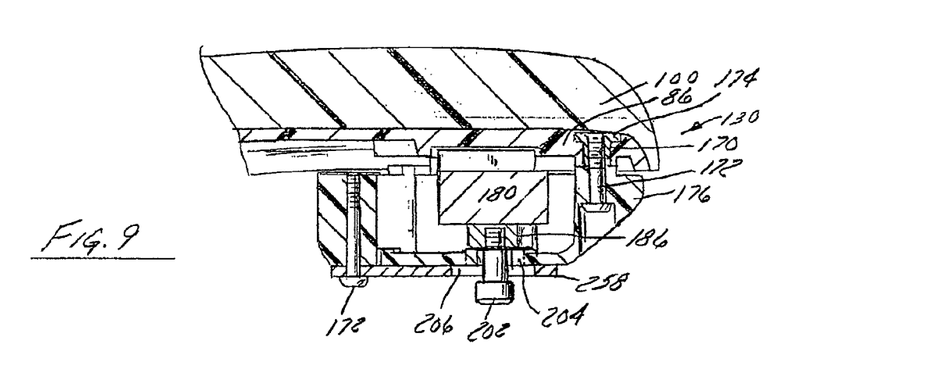
FIG. 9 is a longitudinal cross section view of the front rail mount assembly taken along line 9-9 shown in FIG. 7.

FIGS. 7-9 show various cross-sectional views of forward seat mount assembly 130. Left and right hand mount bodies 176, 178 each include a number of openings 220, 222, 224, 226 that are configured to secure the alternate mount bodies 176, 178 relative to the underside of a respective nose portion 152, 154 of base 86. It is appreciated that such an arrangement is but one means for securing mount bodies 176, 178 relative to the nose portions of base 86. It is further appreciated that mount bodies 176, 178 could be formed integrally with base 86 so as to extend from the underside thereof.

Regardless of the connection modality between base 86 and mount bodies 176, 178, each groove 204, 206 formed in each respective mount body 176, 178 includes a forward facing end 228 and a rearward facing end 230. Forward facing ends 228 are oriented more forward relative to longitudinal axis 106 and more laterally outboard relative to a respective rearward end 230 of the corresponding groove. Each post 202 is securely and fixedly positioned with respect to shuttle 186 but slidably cooperates with a groove 204, 206 associated with a respective mount body 176, 178.

Actuator 184 includes a head portion 238 that is configured to cooperate with a driving tool, such as a hex wrench via a cavity 240 (FIG. 5), or other suitable rotationally driving arrangement. Actuator 184 includes a shank 242 that rotationally cooperates with a passage 246 (FIG. 8) formed in rail garage 180. Actuator 184 is associated with rail garage 180 to allow rotational operation of actuator 184 without altering the longitudinal association between actuator 184 and rail garage 180.

Shuttle 186 threadably cooperates with a threaded portion 192 of actuator 184 such that rotation of actuator 184 translates shuttle 186 in the longitudinal direction, indicated by arrow 248 (FIG. 8) relative to rail garage 180 and rail 87 and thereby altering the longitudinal position of posts 202 relative to rail 87 and rail garage 180. A rearward end 250 of actuator 184 cooperates with rail garage 180 so as to be rotationally supported thereat. As shown in FIG. 8, shuttle 186 is moveable between a forward position 252 and a rearward position 254 upon rotation of actuator 184 and is accommodated in a cavity 256 defined by the cooperation of rail garage 180 and a base plate 258.

As shown in FIG. 9, plate 258 includes elongated channels 260 that extend in a longitudinal direction generally aligned with longitudinal axis 106 of seat assembly 12. Channels 260 are offset in the opposite lateral directions relative to axis 106 so as to be aligned with a longitudinal axis associated with translation of post 202 during movement of shuttle 186. Referring back to FIG. 7, operation of actuator 184 translates shuttle 186 in a longitudinal direction aligned with axis 106. Posts 202 are secured to arms 194, 196 of shuttle 186 such that posts 202 also translate in only a longitudinal direction that is parallel to the axis of operation of actuator 184. Unlike grooves 260 associated with plate 258, grooves 204, 206 associated with the alternate lateral side seat base mount bodies 176, 178 include a lateral component such that the longitudinal translation of posts 202 is converted to lateral translation, indicated by arrows 260, 262 (FIG. 7), of respective seat base mount bodies 178, 176 during rotation of actuator 184.

Figure 10:
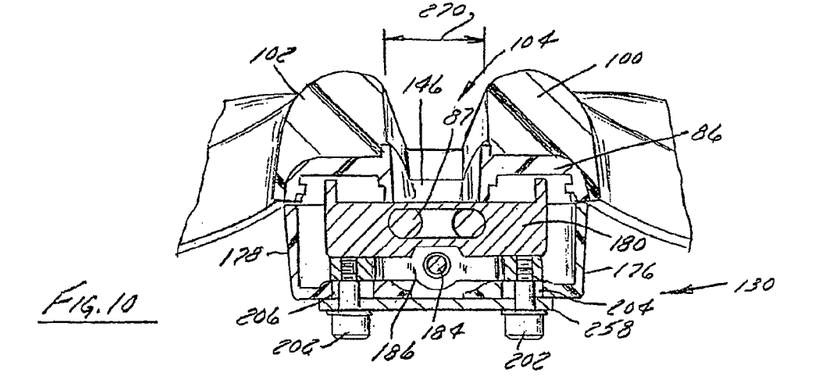
FIG. 10 is lateral cross section view of the front rail mount assembly taken along line 10-10 in FIG. 7 with the shuttle body in an intermediate position.
Figure 11:
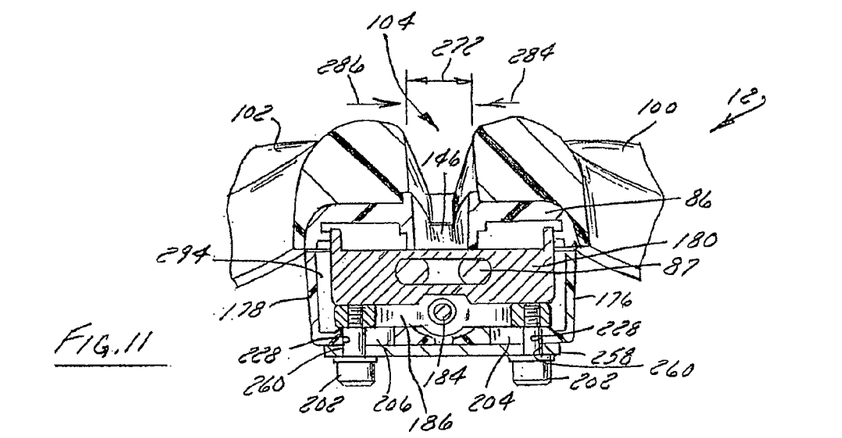
FIG. 11 is a view similar to FIG. 10 taken along ling 11-11 in FIG. 7 and shows the shuttle body adjusted to a forward position so that nose portion of the seat assembly attains a narrowest orientation.
Figure 12:
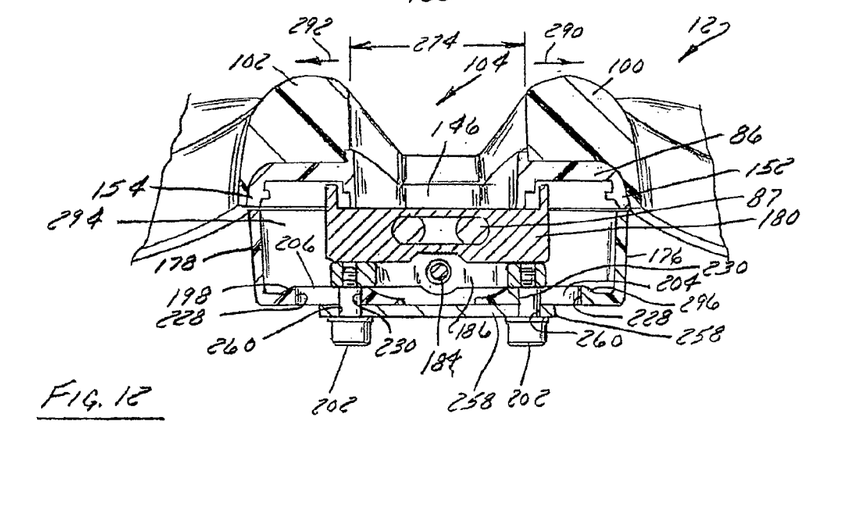
FIG. 12 is a view similar to FIG. 10 taken along line 12-12 and shows the shuttle body adjusted to the rearward position so that nose portion of the seat assembly attains a widest orientation.

FIGS. 10-12 show various nose width configurations that can be achieved with forward rail mount assembly 130. FIG. 10 shows an intermediary width 270 associated with gap 104, FIG. 11 shows a narrowest width 272 associated with gap 104, and FIG. 12 shows a widest width associated with gap 104 attainable via user manipulation of actuator 184. As shown in FIG. 11, when shuttle body 186 is adjusted to a fully forward position relative to rail garage 180, posts 202 are displaced toward the forward end of grooves 260 formed in plate 258 as well as the forward ends 228 of grooves 204, 206 associated with respective mount bodies 176, 178. Said another way, as shuttle body 186 is translated in the longitudinal forward direction, mount bodies 176, 178 translate in an inward lateral direction, indicated by arrows 284, 286 (FIG. 11) toward longitudinal centerline 106 the saddle assembly 12.

Inversely, manipulation of actuator 184 in a counterclockwise rotational direction translates shuttle 186 in a rearward direction along a longitudinal axis 106 thereby translating posts 202 toward a rearward end 230 of grooves 204, 206. The rearward translation of posts 202 translates mount bodies 176, 178, and thereby nose portions 152, 154 of base 86, in opposite laterally outward or outboard directions, indicated by arrows 290, 292, (FIG. 12) respectively. Comparing FIGS. 11 and 12, it is shown that the inward lateral positioning of mount bodies 176 178 provides a small spacing 294 between the respective mount body 176, 178 and a respective alternate lateral side of rail garage 180, as shown in FIG. 11, whereas outward lateral positioning of mount bodies 176, 178 increases the size of spacing 294 during the outward lateral translation of mount bodies 176, 178 as shown in FIG. 12.

Still referring to FIGS. 11 and 12, plate 258 is constructed to be secured to rail garage 180 such that shuttle 186 and a flange 296, 298 of each of mount body 176, 178 can be slidably positioned between plate 258 and rail garage 180. Shuttle 186 translates in the solely longitudinal in a direction aligned with axis 106 between rail garage 180 and plate 258 whereas the flange 296, 298 of each mount body translates in opposite lateral directions, indicated by arrows 284, 286, 290, 292, relative to shuttle body 186, rail garage 180, and plate 258. Such a construction allows slidable but non-interfering engagement between shuttle 186 and flanges 296, 298 of each respective mount body 176, 178 while plate 258 protects the moveable operation of seat rail mount assembly 130.

Although it is understood that the alternate lateral sides of seat assembly 12 could be connected in a manner that allowed the forward nose portions to touch one another when in a most inward position, preferably distance 272 or the narrowest width of groove 104 is between approximately 0.5-8 mm, and more preferably between 1-3 mm when the alternate left and right hand saddle portions are nearest to one another whereas a largest width or distance 274 of groove 104 is between approximately 10-30 mm, more preferably between approximately 15-25 mm, and more preferably about 20 mm. It is appreciated that groove 104 can be provided with a width that comfortably accommodates the genitalia of a rider and/or in a manner that does not compress the rider's genitalia or perennial area. An outer width 273 of the forward tip of seat assembly 12 is about 40-50 mm, and more preferably between approximately 45 mm when the seat assembly is in its narrowest configuration and about 55-70 mm, and preferably about 63 mm when in its widest orientation. It is appreciated that the narrowest width of groove 104 can be selected to provide a comfortable interaction with rider genitalia whereas the outer width 273 can be selected to provide a desired interaction with the inner thigh of the rider. Such a construction allows saddle assembly 12 to achieve infinite nose width and groove width adjustments. Seat assembly 12 provides a singular seat construction that can be quickly configured to satisfy the personal fit requirements or preferences of a large class of users in a fairly uniform product package. It is appreciated that seat assembly 12 could be constructed to provide other widths associated with dimensions 272, 273, 274 by simply altering the location of the cooperation of base 86 with mount bodies 176, 178, manipulating the lateral thickness of the respective left and right hand nose portions of the seat assembly, and/or altering the length associated with grooves 204, 206, 260, the longitudinal operating length associated with the interaction between shuttle 186, actuator 184, and garage or housing 180.

Therefore, one embodiment of the invention includes an adjustable width bicycle seat assembly that includes a housing secured to a seat rail. A shuttle body is slidably positioned with respect to the housing and the seat rail. An adjuster is engaged between the housing and the shuttle body such that rotation of the adjuster translates the shuttle body relative to the housing along an axis of rotation of the adjuster. A mount body that is constructed to be secured to a portion of a saddle shell is engaged with the adjuster such that rotation of the adjuster translates the mount body and the portion of the saddle shell in a direction that crosses the axis of rotation of the adjuster.

Another embodiment of the invention that includes one or more features combinable with the embodiment described above includes a bicycle seat assembly having a shell that includes a right side portion and a left side portion that are connected by a web wall that extends across a longitudinal centerline of the bicycle seat assembly. A first pad overlies the right side portion of the shell and a second pad overlies the left side portion of the shell. The first pad and the second pad define a channel that extends along the longitudinal center line of the assembly. A shuttle is slidably associated with a rail garage and an adjuster is engaged with the shuttle and the rail garage. The adjuster is rotatable about an axis that is aligned with the longitudinal centerline of the bicycle seat assembly such that operation of the adjuster manipulates a position of the shuttle relative to the rail garage. A first mount body is secured to the right side portion of the shell and a second mount body is secured to the left side portion of the shell. The first and the second mount bodies are engaged with the shuttle such that fore and aft translation of the shuttle yields lateral translation of the first and second mount bodies.

Another embodiment of the invention that includes one or more features that are combinable with one or more of the features of the various embodiments discussed above includes a bicycle seat assembly having a base that includes a right nose portion and a left nose portion. The respective nose portions are separated by a gap that extends along a longitudinal axis of the bicycle seat assembly. A first mount body is secured to the left nose portion and a second mount body is secured to the right nose portion. An actuator is engaged with a rail support and is rotatable about an axis that is aligned with the longitudinal axis of the bicycle seat assembly. A guide operatively connects the actuator and the first mount body and the second mount body so that rotation of the actuator 1) translates the actuator in a direction aligned with the axis of the actuator, 2) translates the first mount body in a first lateral direction, and 3) translates the second mount body in a second lateral direction opposite the first lateral direction.

The present invention has been described in terms of the preferred embodiments, and it is recognized that equivalents, alternatives, and modifications, aside from those expressly stated, are possible and within the scope of the appending claims. It is further appreciated that the respective features of any one of the embodiments discussed above is not necessarily solely exclusive thereto.

What is claimed is:
1. An adjustable width bicycle seat apparatus, comprising:
  a one-piece saddle body including:
    a first side portion and a second side portion connected by a web wall configured to act as a living hinge;
  wherein:
    a rearward end of the first side portion and a rearward end of the second side portion are separated by a recess;
    the web wall is configured such that
      the rearward end of the first side portion and the rearward end of the second side portion can be moved toward and away from each other;
      the first side portion comprises a first nose and the second side portion comprises a second nose;

the first nose and the second nose can be moved toward and away from each other; and when the first nose and the second nose move toward one another, the rearward end of the first side portion and the rearward end of the second side portion move away from each other.

2. The apparatus of claim 1, wherein the web wall is configured such that the first nose and the second nose can be adapted for at least one anatomical feature of a particular rider.

3. The apparatus of claim 1, wherein the first nose and the second nose are separated by an elongated groove.

4. The apparatus of claim 3, wherein the elongated groove extends from the web wall to a forward end of the one-piece saddle body.

5. The apparatus of claim 4, wherein the elongated groove is at least twice as long as the recess.

6. The apparatus of claim 1, further comprising an adjuster configured to move the first nose and the second nose toward and away from each other.

7. The apparatus of claim 1, further comprising a first pad attached to the first side portion and a second pad attached to the second side portion.

8. The apparatus of claim 7, wherein the first pad and the second pad are configured to support a rider.

9. The apparatus of claim 1, wherein the first side portion comprises an aft cavity configured to accept a rail and the second side portion comprises an aft cavity configured to accept a rail.

10. The apparatus of claim 1, wherein the first side portion, the second side portion, and the web wall are configured in an H shape.

\* \* \* \* \*